United States Patent
Furukawa et al.

(10) Patent No.: US 8,234,309 B2
(45) Date of Patent: Jul. 31, 2012

(54) METHOD FOR AUTOMATICALLY MODIFYING A TREE STRUCTURE

(75) Inventors: Masahiro Furukawa, Fujisawa (JP); Tomohiro Miyahira, Yamato (JP); Yoshiroh Kamiyama, Tokyo-to (JP); Chris Schaubach, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 11/048,043

(22) Filed: Jan. 31, 2005

(65) Prior Publication Data

US 2006/0173882 A1  Aug. 3, 2006

(51) Int. Cl.
*G06F 7/00* (2006.01)
*G06F 17/30* (2006.01)

(52) U.S. Cl. ........................... 707/797; 715/713
(58) Field of Classification Search .......... None
See application file for complete search history.

(56) References Cited

U.S. PATENT DOCUMENTS

| | | | |
|---|---|---|---|
| 4,891,766 A * | 1/1990 | Derr et al. ........... | 706/60 |
| 5,471,613 A * | 11/1995 | Banning et al. ............ | 1/1 |
| 5,574,910 A * | 11/1996 | Bialkowski et al. ........... | 707/1 |
| 5,778,371 A * | 7/1998 | Fujihara ..................... | 1/1 |
| 5,825,944 A * | 10/1998 | Wang ......................... | 382/309 |
| 6,334,156 B1 * | 12/2001 | Matsuoka et al. ........... | 709/252 |
| 6,385,612 B1 * | 5/2002 | Troisi .......................... | 707/7 |
| 6,411,957 B1 * | 6/2002 | Dijkstra ...................... | 707/100 |
| 6,978,271 B1 * | 12/2005 | Hoffman et al. ............. | 707/101 |
| 7,734,628 B2 * | 6/2010 | Chan et al. ................. | 707/737 |
| 2001/0029510 A1 * | 10/2001 | Tokui ........................... | 707/200 |
| 2003/0182565 A1 * | 9/2003 | Nakano et al. .............. | 713/193 |
| 2004/0205594 A1 * | 10/2004 | Arora et al. ................. | 715/513 |
| 2006/0004563 A1 * | 1/2006 | Campbell et al. ............ | 704/9 |

FOREIGN PATENT DOCUMENTS

| | | |
|---|---|---|
| EP | 295460 A2 | 12/2008 |
| JP | 8137914 | 5/1996 |
| JP | 8237471 | 9/1996 |
| JP | 305363 | 11/1997 |
| JP | 194466 | 7/2000 |
| JP | 345717 | 12/2003 |

* cited by examiner

*Primary Examiner* — Khanh Pham
*Assistant Examiner* — Azam Cheema
(74) *Attorney, Agent, or Firm* — Lieberman & Brandsdorfer, LLC

(57) ABSTRACT

A method and system are provided to support automated modification to a multiple node tree structure. Each clause and each logical operator are defined in the tree structure as nodes. In addition, each link emanating from a child node to a parent node is defined as a child link, and each link emanating from a parent node to a child node is defined as a parent link. The selection and location of an operator for placement in the tree structure will be automated in response to the position selected.

17 Claims, 5 Drawing Sheets

METHOD FOR AUTOMATICALLY MODIFYING A TREE STRUCTURE

BACKGROUND OF THE INVENTION

1. Technical Field

This invention relates to a method for modifying a logical expression. More specifically, the method automates placement of a new node to a parent node that supports at least three connecting nodes.

2. Description of the Prior Art

Data structures in the form of trees are known as efficient tools for building tables and supporting searches beginning with a known prefix. A tree is a data structure accessed first at the root node. Each subsequent node can be either an internal node with further subsequent nodes or an external node with no further nodes existing under the node. An internal node refers to or has links to one or more descending or child nodes and is referred to as the parent of its child nodes, and external nodes are commonly referred to as leaves. The root node is usually depicted at the top of the tree structure and the external nodes are depicted at the bottom.

Tree structures are often defined by the characteristics of the tree. For example, a Binary Tree is a tree with at most two children for each node. A Digital Tree is a rooted tree where the leaves represent strings of digital symbols. The Patricia Tree is a Digital Tree with suppression of one way branching that prohibits keys which are strict prefixes of other branches. In general, a Patricia tree is always a digital tree, but only a binary tree when the symbol alphabet is binary. The internal nodes represent a common prefix to a set of strings, and each child of that node corresponds to a choice of the next symbol to follow the common prefix. A Patricia Tree can take the form of a Binary Tree and a Digital Tree where all internal nodes have at least two children.

Problems arise in adding leaves to the tree structure. In a Binary Tree where there is at most two children for each node, adding a leaf to the tree is straight forward. However, problems arise in a multiple node tree which supports more than two child nodes for each parent node. Prior art methods for modifying a tree structure that supports more than two children per node require a person to specify whether it is an operation to add a binary operator or to add a node to the tree. However, this method is time consuming as the person must select the location and operator for each child node to be added to the tree structure. Therefore, there is a need that supports automating placement of a new node in a tree structure that support more than two children per node.

SUMMARY OF THE INVENTION

This invention comprises a method and system for automating modification of a multiple node supporting tree structure based upon selection of a location for addition of a new leaf node.

In one aspect, a method is provided to amend a multiple node tree structure. A determination of a position to add a new node in the tree structure is conducted. In response to the determination, a placement of the new node to be added to the tree structure is automatically selected. The new node may be a new logical operator and/or a clause to a logical operator.

In another aspect, a system is provided with an operation manager to determine a position within a multiple node supporting tree structure for addition of a new node. An automated selection manager is also provided to automatically place the new node in the tree structure. The automated selection manager is responsive to the operation manager. The new node may be in the form of a new logical operator and/or a new clause to a logical operator.

In yet another aspect, an article is provided with a computer-readable storage medium. Means in the medium are provided for determining a position within a multiple node supporting tree structure for placement of a new node. In addition, means in the medium are provided for automatically placing the new node in the tree structure. The automatic placement means are responsive to the position determination means. The new node may be a new logical operator and/or a clause to a logical operator.

Other features and advantages of this invention will become apparent from the following detailed description of the presently preferred embodiment of the invention, taken in conjunction with the accompanying drawings.

DESCRIPTION OF THE EMBODIMENTS

Overview

Automating the process of modifying a binary tree structure in the form of adding a new node to a node that can only have two child nodes is known in the art. However, in a tree structure where each node can have three or more nodes, i.e. N-ary operators, automating the process of modifying the tree structure when a new node is added becomes complicated. In one embodiment of the invention, a distinction is made between a parent node and a child node, and connections near a child node, known as a child link, and connections near a parent node, known as a parent link.

Technical Details

Figure 1:
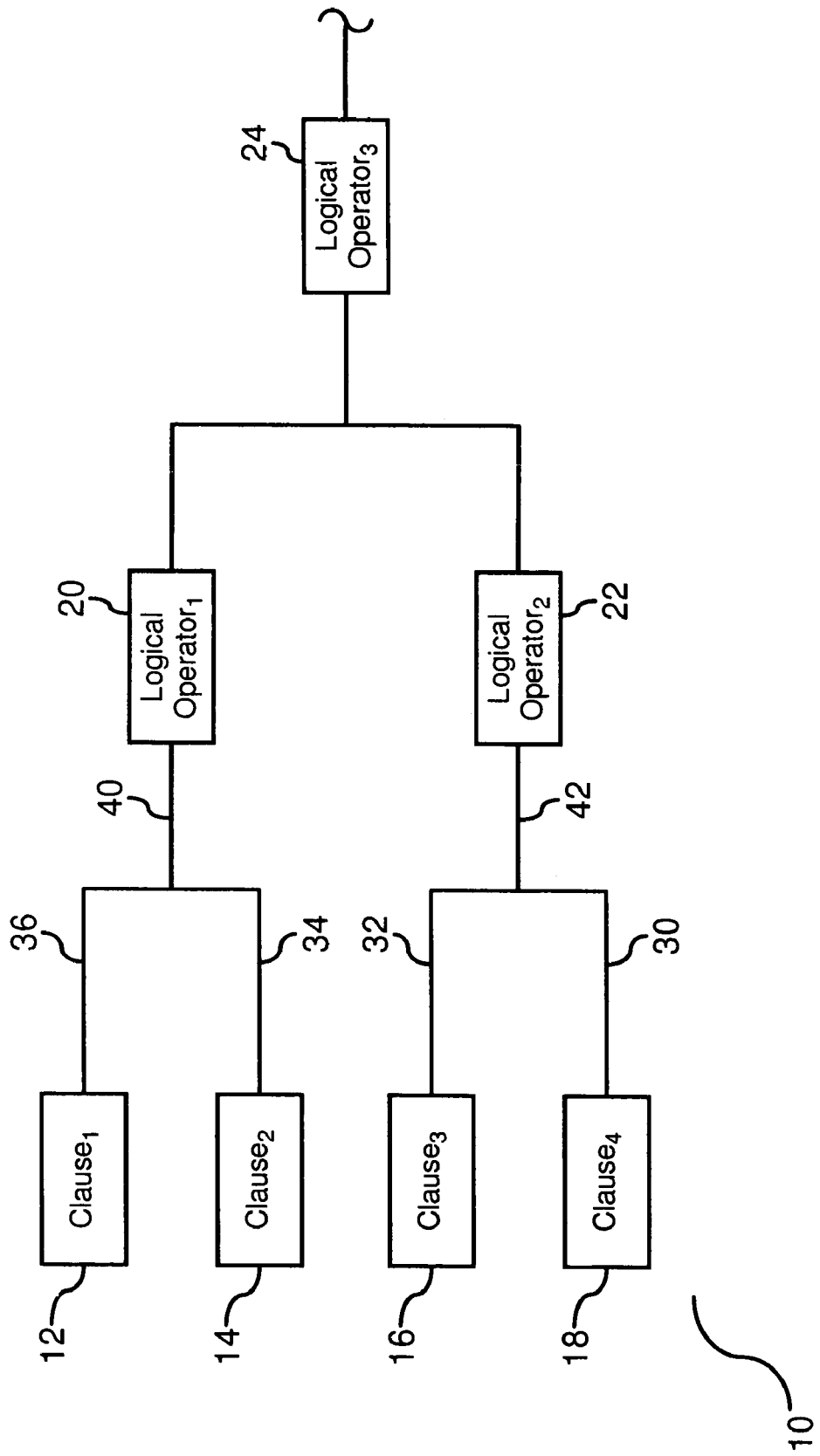
FIG. 1 is a prior art diagram of a tree structure.

FIG. 1 is a block diagram (10) of a tree structure with four clauses (12), (14), (16), (18), represented as nodes, and three logical operators (20), (22), and (24). Each clause (12), (14), (16), and (18) is defined as a child node from the perspective of the logical operators (20) and (22). Similarly, each logical operator (20), (22), (24) is defined as a node, with logical operator$_1$ node (20) and logical operator$_2$ node (22) being parents nodes to clauses (12), (14), (16), and (18), and logical operator$_3$ node (24) being a parent node to logical operator$_1$ node (20) and logical operator$_2$ node (22). Logical operator$_1$ node (20) is a parent node to clause$_1$ (12) and clause$_2$ node (14), and logical operator$_2$ node (22) is a parent node to clause$_3$ node (16) and clause$_4$ node (18). Although both logical operator$_1$ node (20) and logical operator$_2$ node (22) are parent nodes to the defined child node, they may be defined as child nodes to logical operator$_3$ node (24). It is important to note that a logical operator can be a child node as well. However, in the example shown herein the logical operator nodes are parent nodes to the defined child nodes. A connection from the clause$_4$ node (18) to the logical operator$_2$ node (22) is defined as a child link (30), and a connection from clause$_3$ node (16) to logical operator$_2$ node (22) is also defined as a child link (32). Similarly, a connection from the clause$_2$ node (14) to logical operator$_1$ node (20) is defined as a child link (34), and a connection from the clause$_1$ node (12) to logical operator$_1$ node (20) is defined as child link (36). In addition to the child links as defined, parent links are the connections emanating from the parent node. A connection from logical operator$_1$ node (20) to child links (34) and (36) is defined as parent link (40), and a connection from logical operator$_2$ node (22) to child links (30) and (32) is defined as parent link (42). Accordingly, each node and each link connecting nodes are defined in the tree structure.

Figure 2A:
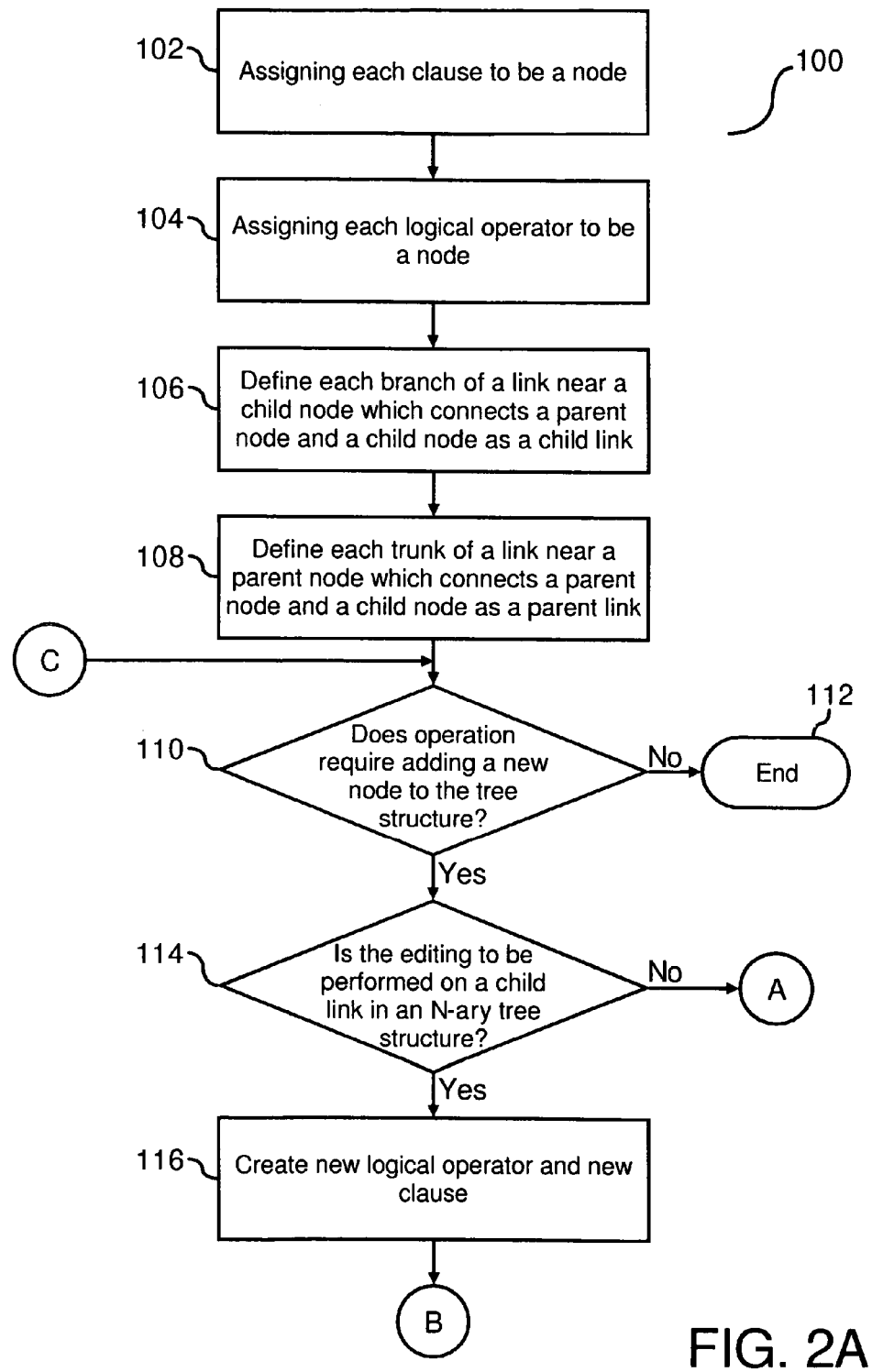
FIGS. 2a and 2b are flow charts illustrating a process for modifying a tree structure according to the preferred embodiment of this invention, and is suggested for printing on the first page of the issued patent.
Figure 2B:
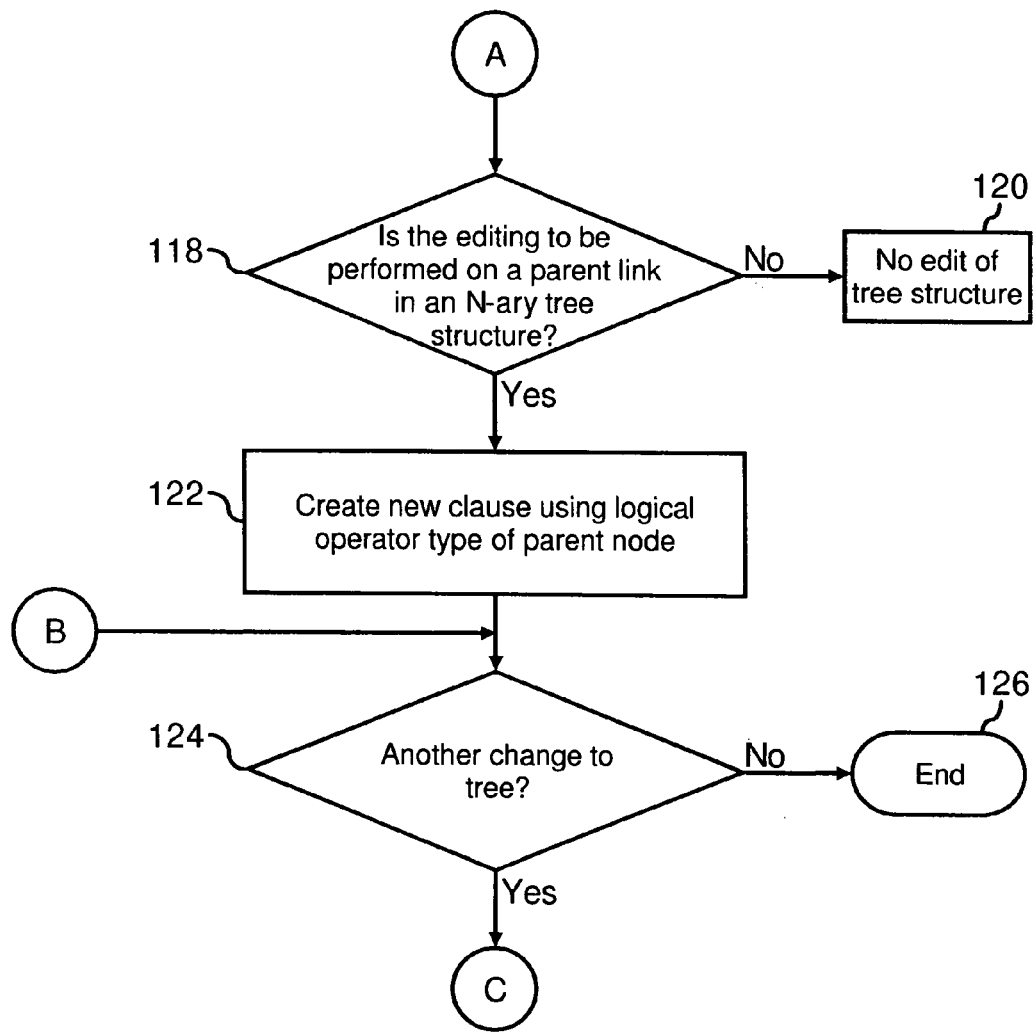

Once each of the elements in the tree structure are defined, modification of the tree structure may be automated. FIGS. 2A and 2B are a flow chart (100) illustrating a process for automating selection and placement of a new node in a tree structure. Each clause in the tree structure is designated as a node (102), and each logical operator in the tree structure is designated as a node (104). Furthermore, each link near a child node among the links which connect a parent node and a child node, the portion of the branch, is defined as a child link (106), and each link near a parent node among the links which connect a parent node and a child node, the portion of the trunk, is defined as a parent link (108). Before initiating a change to the tree structure, a test is conducted to determine if the change requires adding a new node to the tree structure (110). A negative response to the test at step (110) is an indication that the change may be in the form of editing an existing node, whether it be one or more of the logical operators or one of more of the clauses in the tree structure. As such, the process of adding a new node to the existing tree structure ends (112). However, if the response to the test at step (110) is positive, a subsequent test is conducted to determine if the new node to be added to the tree structure is located on a child link in a multiple node supporting tree structure (114) as defined at step (106). A positive response to the test at step (114) will result in creation of a new logical operator and a new clause in the multiple node supporting tree structure (116). However, a negative response to the test at step (114) or following the completion of step (116) will result in another test to determine if the new node to be added to the tree structure is located on a parent link in a multiple node supporting tree structure (118) as define at step (108). If the response to the test at step (118) is negative, this is an indication that the modification of the tree structure does not include addition of a new node to the tree structure (120). However, a positive response to the test at step (118) will result in creation of a new clause in the form of a new child node using the logical operator type of the parent node (122). Following the creation of the new node at step (122), a final test is conducted to determine if there are any additional changes to be made to the tree structure (124). A positive response to the test at step (124) will result in a return to step (110) to determine the location and modification to be made to the tree structure. Similarly, a negative response to the test at step (124) will result in a conclusion of modifications to the tree structure (126). Accordingly, the process of determining the placement and category of a modification to a tree structure is automated based upon the specified location of the modification.

As described in FIGS. 2A and 2B, each clause is defined as a node and each logical operator is defined as a node. In one embodiment, the logic shown in FIG. 2 may be embodied into a tool that includes an interface to enable a user to intuitively modify a tree structure. The tool may be stored on a computer-readable storage medium as it is used to modify data in a machine readable format. The tool may include a requestor to determine the need for modifying the tree structure and to communicate with a manager to select the location and modification of the tree structure. The requestor and manager of the tool manager may be in the form of hardware elements within the computer system, or software elements in a computer-readable storage medium.

Figure 3:
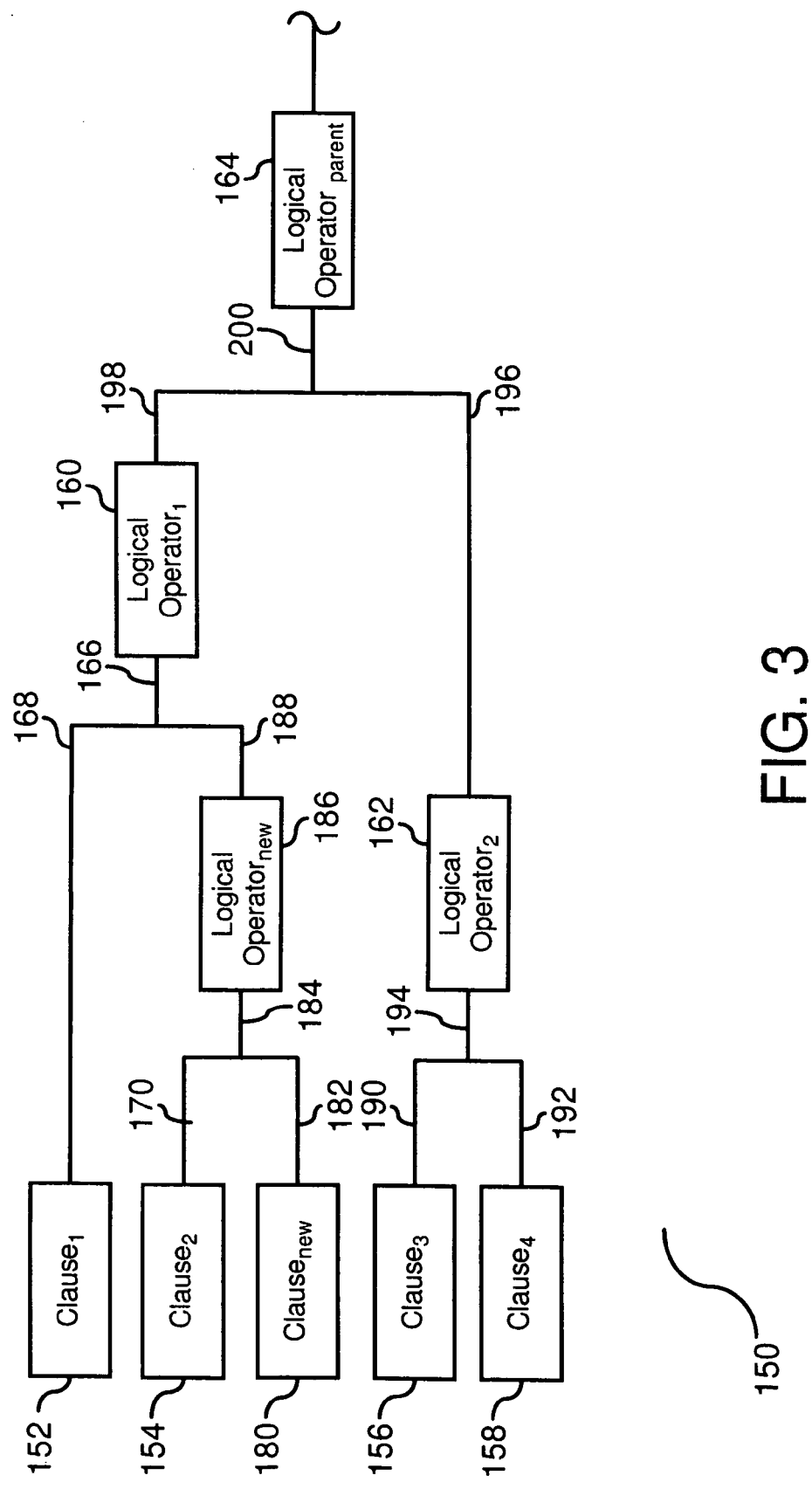
FIG. 3 is a block diagram of a modified tree structure following selection of a child link.

FIG. 3 is a block diagram (150) of the modified tree structure of FIG. 1 after editing a binary operator on child link (34). As shown, there are four original clauses (152), (154), (156), and (158), and three original logical operator nodes (160), (162) and (164). Each clause node has a child link connected to a parent link of a logical operator node. Following the process of editing the binary operator on child link (34), a new clause$_{NEW}$ node (180) is created with a new child link (182) in communication a new parent link (184) of a new node, logical operator$_{NEW}$ (186). Similarly, clause$_1$ node (152) retains child link (168) in communication with parent link (166) of logical operator$_1$ node (160), clause$_2$ node (154) obtains a new child link (170) in communication with new link (184) of a new logical operator$_{NEW}$ node (186), clause$_3$ node (156) retains child link (190) in communication with parent link (194) of logical operator$_2$ node (162), and clause$_4$ node (158) retains child link (192) in communication with parent link (194) of logical operator$_2$ node (162). Accordingly, the process of editing a child link to add a new logical operator in a tree structure that support multiple nodes results in creation of both a new child node having a new clause and a new parent node in the form of a logical operator.

Figure 4:
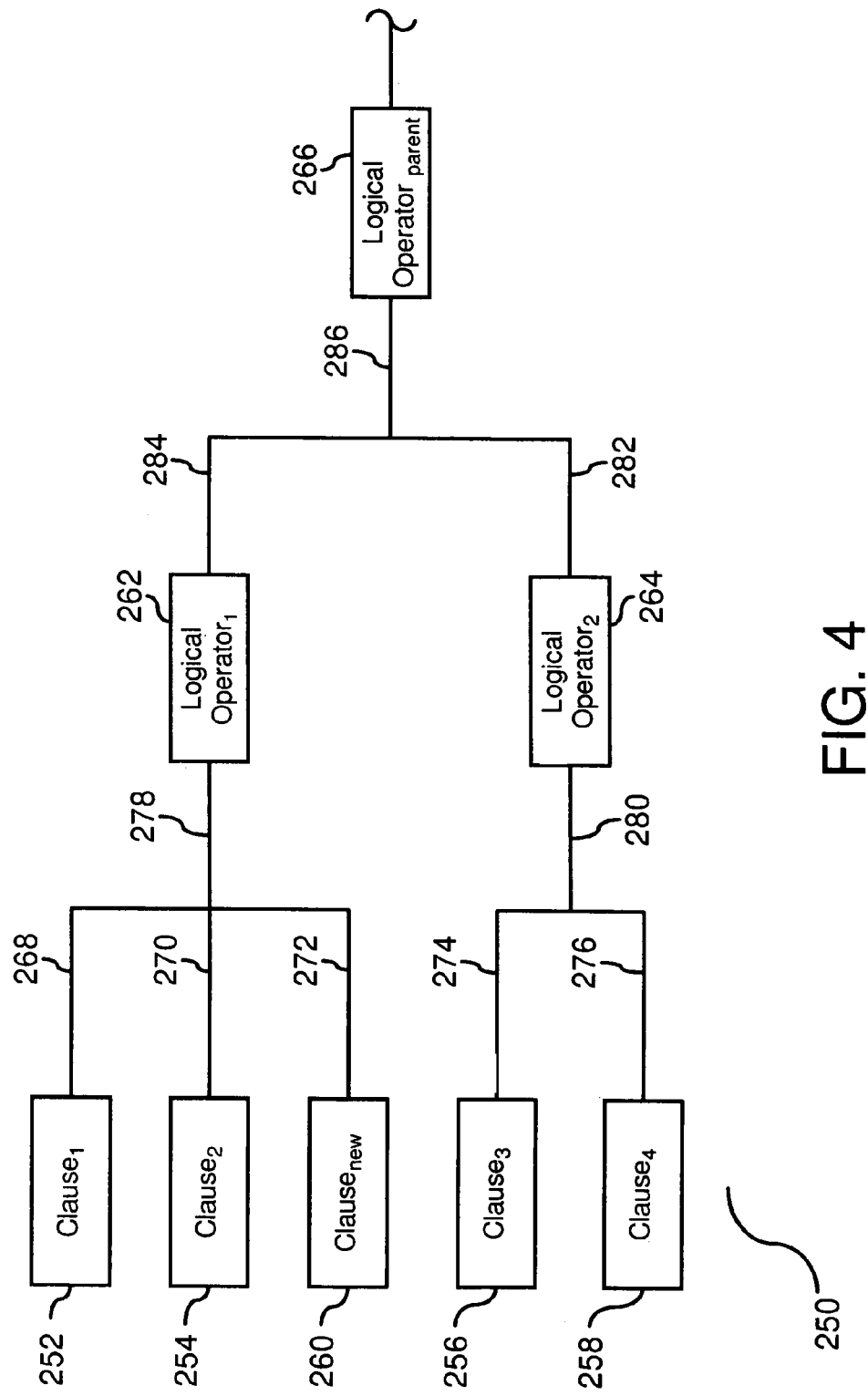
FIG. 4 is a block diagram of a modified tree structure following selection of a parent link.

FIG. 4 is a block diagram (250) of the modified tree structure of FIG. 1 after editing a binary operator on parent link (40). As shown, there are four original clauses (252), (254), (256), and (258), and three original logical operator nodes (262), (264), and (266). Each clause node has a child link connected to a parent link of a logical operator node. Following the process of editing the binary operator on parent link (278), a new clause$_{NEW}$ node (260) is created with a new child link (272) in communication with the original parent link (278) of logical operator$_1$ node (262). Similarly, clause$_1$ node (252) has a child link (268) in communication with parent link (278) of logical operator$_1$ node (262), clause$_2$ node (254) has a child link (270) in communication with parent link (278) of logical operator$_1$ node (262), clause$_3$ (256) has a child link (274) in communication with parent link (280) of logical operator$_2$ node (264), and clause$_4$ (258) has a child link (276) in communication with parent link (280) of logical operator$_2$ node (264). Accordingly, the process of editing a parent link to add a new logical operator in a tree structure that supports multiple nodes results in creation of a new clause with three or more child nodes (252), (254) and (260) all in communication with parent link (278).

Advantages Over the Prior Art

The classification of each node and each connection in a multiple node supporting tree structure supports automated editing of the tree structure. Each part of a link, whether it is a child link or a parent link, performs an operation related to a nearby node. The location of the proposed change to the tree structure automatically selects the type of node to be added to the tree structure. When the link selected for editing is associated with a multiple clause operator, a new leaf may be created to the node so that the node support three or more leaves. Accordingly, the tool supports automatically editing a multiple node tree structure based upon a selection of a link within the tree structure.

Alternative Embodiments

It will be appreciated that, although specific embodiments of the invention have been described herein for purposes of illustration, various modifications may be made without departing from the spirit and scope of the invention. In particular, the method and tool shown herein may be applied to a binary tree to support automated modifications to the tree structure. Accordingly, the scope of protection of this invention is limited only by the following claims and their equivalents.

We claim:

1. A method for amending a multiple node tree structure comprising:
    data storage media for storing the tree structure;
    classifying each node and each link within a connection in said tree structure, wherein said nodes include a child node and a parent node, and said connection includes a child link and a parent link, said child link defined as a branch within the connection, said branch emanating from said child node, and said parent link is defined as a trunk within said connection, said trunk emanating from said parent node, and at least two connections in said tree structure have separate branches emanating from different child nodes, each of the branches in communication with a common trunk emanating from a common parent node;
    selecting a position within said tree structure for adding a new node;
    editing said tree structure, including determining a type of said new node to be added to said tree structure based upon said link classification within a connection corresponding to said selected position in said tree structure;
    wherein said type of said new node and said parent and child nodes are selected from a group consisting of: a logical operator and a logical clause: and
    wherein editing said tree structure includes adding a new child node using an operator of the parent node as an n-ary operator in response to addition of said new node on said parent link.

2. The method of claim 1, wherein the step of editing said tree structure includes creating a new clause node and a new logical operator node in response to selecting the child link.

3. The method of claim 1, further comprising adding a new node on said parent link, including creation of a new operator and a new clause having at least three child nodes.

4. The method of claim 1, wherein the step of editing said tree structure includes adding a new child node with a new child link in communication with said parent link of a new parent node in response to editing a binary operator on said child link in said tree structure.

5. The method of claim 1, wherein the step of editing said tree structure includes creating a new child node with a new child link in communication with an original parent link of a binary operator in response to editing a binary operator on said parent link in said tree structure.

6. The method of claim 1, further comprising each parent node having at least three child nodes.

7. A computer system comprising:
    a processor in communication with storage media;
    a data structure in the form of a tree structure stored on said storage media;
    said tree structure configured to support multiple nodes with at least one connection between adjacent nodes, wherein each node is selected from the group consisting of: a logical operator node and a logical clause node;
    each of said nodes classified as one of a child node and a parent node, and each connection having a link classification including a child link and a parent link, said child link defined as a branch within the connection, said branch emanating from said child node, and said parent link defined as a trunk within the connection, said trunk emanating from said parent node, and at least two connections in said tree structure have separate branches emanating from different child nodes, each of the branches in communication with a common trunk emanating from a common parent node;
    an operation manager to select a position for addition of a new node to a multiple node supporting tree structure;
    an automated selection manager responsive to said operation manager to automatically determine a type of said new node to be added to said tree structure based upon said link classification corresponding to said selected position, wherein said type of said new node is selected from a group consisting of: a logical operator and a clause to a logical operator; and
    wherein the automated selection manager amends said tree structure to include a new child node using an operator of the parent node as an n-ary operator in response to addition of said new node on said parent link.

8. The system of claim 7, wherein said automated selection manager amends said tree structure to include a new clause node and a new logical operator node created in response to selecting the child link.

9. The system of claim 8, further comprising the operation manager to add a new logical operator on said parent link, including creation of a new clause.

10. The system of claim 7, wherein the selection manager adds a new child node with a new child link in communication with a parent link of a new parent node in response to editing a binary operator on a child link in said tree structure.

11. The system of claim 7, wherein the selection manager creates a new child node with a new child link in communication with an original parent link of a binary operator in response to editing a binary operator on said parent link in said tree structure.

12. The system of claim 7, further comprising each parent node having at least three child nodes.

13. An article comprising:
    a computer-readable storage medium;
    said storage medium having data in the form of a tree structure, with said tree structure configured with multiple nodes and at least one connection between adjacent nodes, wherein each node is selected from the group consisting of: a logical operator node and a logical clause node;
    a processor to execute instructions in communication with the storage medium, comprising:
        instructions to classify each link within a connection in said tree structure, wherein said nodes include a child node and a parent node, said connection includes a child link and a parent link, and said classify instructions to define said child link as a branch within the connection, said branch emanating from the child node and to define said parent link as a trunk within the connection, said trunk emanating from said parent node, and at least two connections in said tree structure have separate branches emanating from different child nodes, each of the branches in communication with a common trunk emanating from a common parent node;
        instructions to select a position within a multiple node supporting tree structure for placement of a new node;
        instructions to edit said tree structure, including determining a type of said new node to be added to said tree structure based upon the link classification corresponding to the selected position in said tree structure;

wherein said type of said new node is selected from a group consisting of: a logical operator and a logical clause: and wherein instructions to edit said tree structure includes adding a new child node includes using an operator of the parent node as an n-ary operator in response to addition of said new node on said parent link.

14. The article of claim 13, wherein said instructions to edit said tree structure include instructions for creating a new clause node and a new logical operator node in response to selecting the child link.

15. The article of claim 13, wherein said instructions to edit said tree structure includes a creation of a new clause in response to adding a new logical operator on said parent link.

16. The article of claim 13, wherein the instructions to edit said tree structure includes addition of a new child node with a new child link in communication with a parent link of a new parent node in response to editing a binary operator on said child link in said tree structure.

17. The article of claim 13, wherein the instructions to edit said tree structure includes creation of a new child node with a new child link in communication with an original parent link of a binary operator in response to editing a binary operator on said parent link in said tree structure.

* * * * *